Aug. 12, 1969     W. T. FISHER     3,460,430
ROCKET LAUNCHING

Filed April 22, 1968     4 Sheets-Sheet 1

INVENTOR
WILLIAM T. FISHER
BY
*Jennings Bailey Jr.*
ATTORNEY

Aug. 12, 1969   W. T. FISHER   3,460,430
ROCKET LAUNCHING

Filed April 22, 1968   4 Sheets-Sheet 2

INVENTOR
WILLIAM T. FISHER
BY
ATTORNEY

Aug. 12, 1969  W. T. FISHER  3,460,430
ROCKET LAUNCHING
Filed April 22, 1968  4 Sheets-Sheet 4

INVENTOR
WILLIAM T. FISHER
BY
Jennings Bailey Jr
ATTORNEY

United States Patent Office 3,460,430
Patented Aug. 12, 1969

3,460,430
ROCKET LAUNCHING
William Thoby Fisher, Banwell, Weston-super-Mare, Somerset, England, assignor to Bristol Aerojet Limited, Somerset, England, a British company
Continuation-in-part of application Ser. No. 521,095, Jan. 17, 1966. This application Apr. 22, 1968, Ser. No. 730,674
Int. Cl. F41f 3/04
U.S. Cl. 89—1.818                                8 Claims

ABSTRACT OF THE DISCLOSURE

A rocket launcher comprising a tube containing a main rocket and a booster assembly having a booster rocket motor and a piston member secured to the booster rocket motor, the tube having a rear wall with an aperture therethrough.

---

This application is a continuation-in-part of application Serial No. 521,095, filed January 17, 1966, now U.S. Patent No. 3,379,097, in the name of William Thoby Fisher, and entitled "Rocket Launching."

This invention is concerned with rockets which are launched from a tube in which they are accelerated from a static position with the assistance of one or more booster rockets.

In a known arrangement the tube is completely open at the rear end; that is to say, the bore in the tube extends right through the tube. The rocket may therefore be inserted into the tube through the rear end.

We have found that the gas discharge from the rocket, tends to draw out with it air from behind the rocket, and therefore creates a partial vacuum at the rear end of the rocket, around the nozzle. Owing to this partial vacuum and to the presence of atmospheric pressure at the front end of the rocket, there is a net retarding force on the rocket while in the tube due to the pressure differential. The magnitude of this force depends, of course, on the cross sectional area of the rocket. If this is considerably less than that of the tube, then the rocket is usually located in the tube by one or more guide members, which also experience a retarding force, and transmit it to the rocket.

It is also known to launch a rocket from a tube of which the rear end is completely closed or is only vented through long passages having right angled bends in them. In such cases a high pressure is built up in the initial stages of launch giving rise to a high acceleration peak. This high peak is undesirable for two reasons. Firstly it causes the rocket to attain a comparatively high velocity early in its passage up the tube. This causes the pressure behind the rocket to fall rapidly later in the passage of the rocket up the tube and this pressure may become negative as the rocket approaches the open end of the tube so that the mean acceleration and hence the launching velocity will be relatively low. It will also be appreciated that most rockets today contain relatively delicate apparatus and/or instruments which severely restrict the maximum acceleration which they will tolerate. In some cases the nature of the fuel may limit the permitted acceleration.

Accordingly, it is an object of the invention to provide a rocket lanucher which will produce during rocket launch an acceleration of the rocket which is approximately constant.

Another object is to obtain a high launching velocity with a low maximum acceleration.

Another object is to provide an effective booster assembly which will provide thrust for the initial acceleration of the main rocket.

According to the present invention, a rocket and launcher assembly comprises a main rocket having a main rocket motor, a booster assembly having a plurality of booster rocket motors, and a launcher including a tube containing said rocket and said booster assembly and having an open delivery end and a rear end and support means for supporting said tube generally vertically and with said rear end clear of the ground, said booster assembly being located in said tube to the rear of said rocket and contacting said rocket to transfer thrust thereto, said booster assembly comprising a plurality of booster rocket motors with their longitudinal axes parallel with and distributed symmetrically around the longitudinal axis of said tube and a piston member extending across substantially the entire internal cross-section of said tube and secured to said booster rocket motors adjacent the rear ends of said rockets and a support structure interconnecting said booster rocket motors adjacent their forward ends and guide means on said support structure and engaging the inner surface of said tube, said tube having a rear wall projecting inwards from the wall of the tube adjacent the rear end of the tube to form an aperture which extends directly through the rear wall to open directly rearwardly into unconfined air.

In general, with a rocket and launcher according to this invention it is possible to keep the pressure behind the piston member at a positive value throughout launching, and thereby obtain a high launching velocity for any given maximum permissable acceleration. The maximum permissible acceleration is liable to be determined by the nature of the contents of the rocket. For example, if the rocket carries meteorological instruments, there is a definite maximum acceleration which the instruments will withstand. Moreover, the tube of the launcher may, if desired, be made considerably longer than hitherto, with a resultant further increase in launching velocity.

We find that, during the initial part of the travel of the rocket along the tube, almost all of the discharge from the nozzles of the booster rocket motors passes out through the aperture in the rear wall, and only a small part of the discharge serves to build up a pressure in the tube behind the piston member. As the rocket proceeds along the tube, the discharge spreads more widely in relation to the aperture in the rear wall, and therefore the greater proportion of the discharge tends to remain within the tube thus promoting an increase in pressure within the rear part of the tube. However, although the rate of discharge from the nozzle may increase, the fact that the rocket is accelerating ensures that the pressure does not rise to an excessive amount.

The size of the aperture in relation to the cross-sections of the tube and of the discharge nozzles of the booster rocket motors may vary depending upon such factors as the mass of the main rocket and the burning rate of the fuel in the booster rocket motors. However the cross-sectional area of the aperture is preferably between one tenth and one third of the cross-sectional area of the tube, the optimum being about one quarter, and is preferably between five and twenty times the total cross-sectional area of the rear ends of the discharge nozzles of the booster rocket motors, the optimum being about eight times.

The accompanying drawings show two examples of launcher and rocket in accordance with the present invention. In these drawings.

Figure 1:
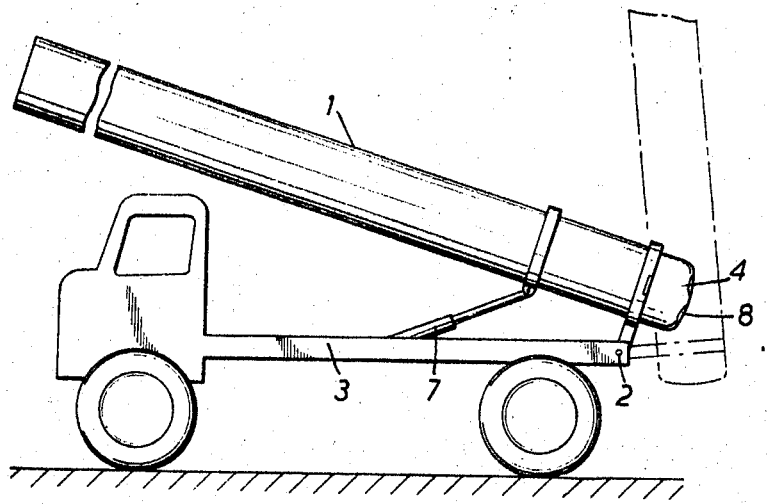
FIGURE 1 is a diagrammatic side elevation of a launcher mounted on a vehicle.
Figure 3:
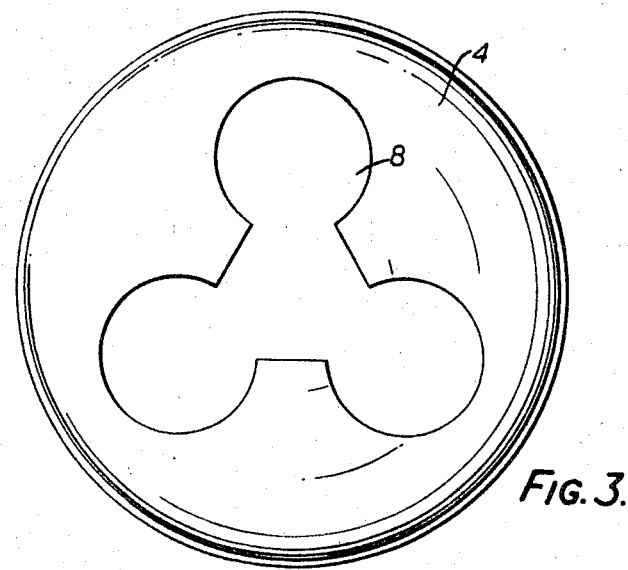
FIGURE 3 is an elevation of the rear end of the launcher showing the aperture in the end wall.
Figure 2:
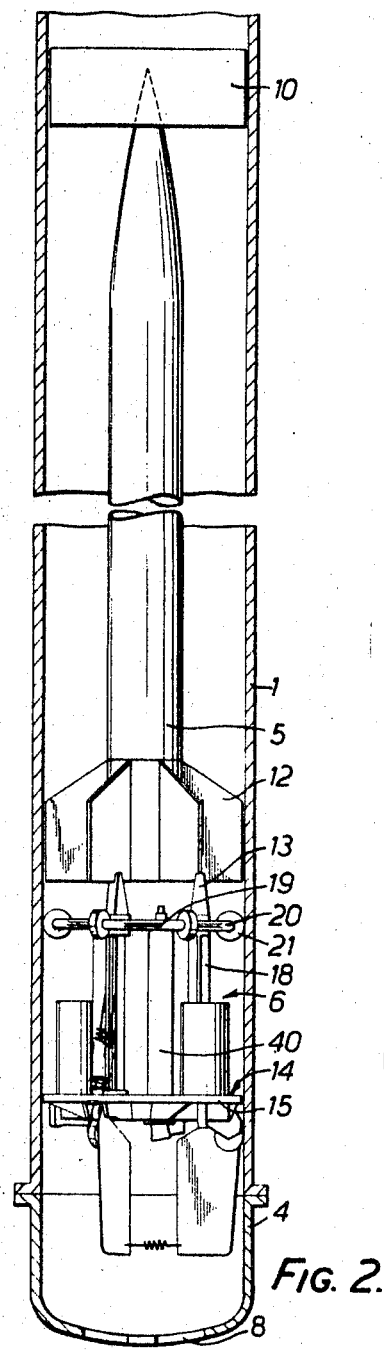
FIGURE 2 is a fragmentary longitudinal section of the rocket and launcher.

The launcher shown in FIGURE 1 consists of a tube 1 of 21 inches internal diameter pivotally mounted at 2 on a vehicle chassis 3. The tube has a removable rear closure member 4 affording a transverse wall across the rear end of the launcher tube 1. When the closure member 4 is removed a rocket 5 and booster assembly 6 (FIGURE 2) can be inserted in the tube 1. The closure member is then replaced and the tube 1 elevated to a vertical or near vertical position by jacking means 7. The rocket and booster are then discharged from the launcher by firing the booster rocket engines and possibly also the main rocket engine. The closure member has an aperture 8 extending through its rear wall, the aperture being bounded by arcs from three circles of 5.5 inches diameter on a pitch circle of 10 inches diameter and the triangle formed by the lines joining the centres of these circles.

The rocket is supported at its forward end by a guide member 10 of expanded polystyrene which guides the rocket during its travel along the launcher tube 1 and which disintegrates during the launching operation. The forward end of the rocket amounting to rather less than half the length of the rocket is available for the payload such as meteorological instruments and for a recovery parachute if one is provided. The lower portion of the rocket below the payload consists of a sustainer rocket motor employing solid fuel and having a single discharge nozzle (not visible in the drawings) at the rear end. The lower end of the rocket has six fixed fins 12, three of which fit into brackets 13 on the booster assembly to support the rocket therefrom.

The booster assembly includes a piston member 14 which is a complex and massive forging and consists of a disc 15 which is of slightly less diameter than the internal diameter of the launcher tube 1, a lower wall 16 spaced from the disc 15 and approximately radial flange walls 17, 17a, 17b and cylindrical walls (not visible in the drawings) joining the lower wall 16 to the disc 15. Extending upwardly from the disc 15 are three stanchions 18 which are connected at their upper ends by a ring member 19. The ring member has six radial projections 20 which are bifurcated and there are six wheels 21 which are mounted on pins bridging the bifurcations and which run on the inner surface of the launcher tube 1 to guide the booster assembly along the tube.

Below the piston member 14 there are three fins 22 which are pivoted to the piston member and which normally are retracted and extend axially below the piston member as shown in full lines in FIGURE 4 but can swing outwardly into radially extending positions as indicated by chain dotted lines in FIGURE 4. Each fin 22 is secured to one leg of a U-shaped member 23 which is pivoted between two radial flange walls 17a and 17b about a pivot pin 24. Pivoted between the legs of the U-shaped members 23 on pivot pins 25 are wheels 26 which, when the fins are in the retracted position as shown in the drawings, also run on the inner surface of the launcher tube 1 as the booster assembly travels along the tube. Each of the fins 22 is biased to its extended position by a pair of coil springs 27 one end of which is secured to one of the stanchions 18 and the other end of which is secured to a point on the U-shaped member 23 outwards of the pivot pin 24. Until the rocket is made ready for launch, the fins are held in the retracted position by a tie 28 consisting of hooks 29 which engage in holes 30 in the fins 22 and a ring 31 which is connected to the hooks by springs 32.

Figure 4:
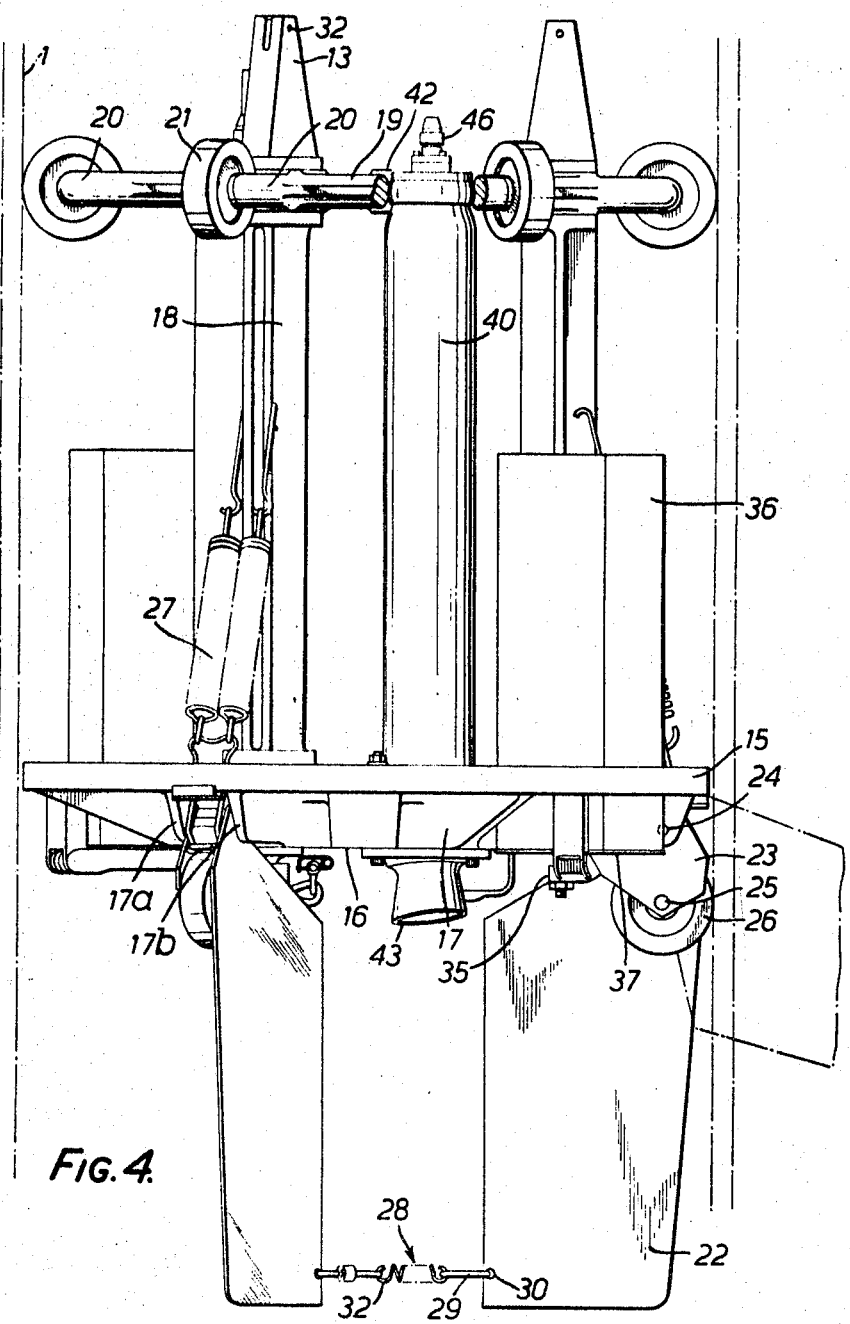
FIGURE 4 is a side elevation of the booster assembly.
Figure 5:
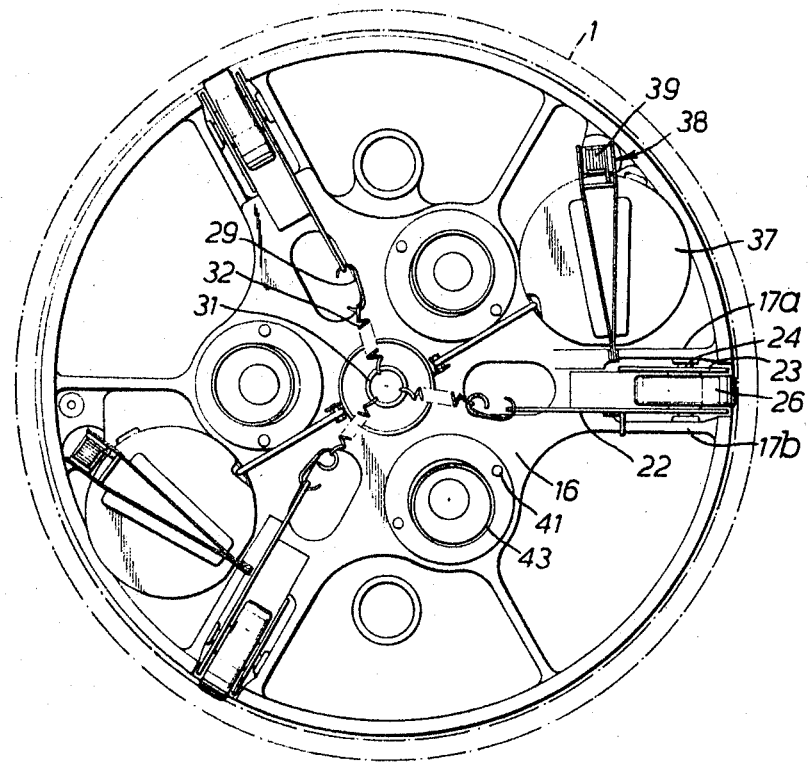
FIGURE 5 is an end elevation of the booster assembly viewed on the nozzle and fin end.

As can be seen in FIGURE 4, the brackets 13 on which the fins 12 of the rocket rest have bifurcated upper ends with pins 32 extending across the bifurcations. The lower edges of the fins 12 have notches (not shown) so that the fins may rest on the brackets with the pins in the notches. Thus the rocket can be properly located with respect to the booster assembly which can transmit thrust to the rocket but the rocket is free to separate from the booster assembly when the velocity of the rocket is greater than that of the booster assembly.

Secured to and extending through the disc 15 are a pair of parachute cans 36 having lids 37 which are pivoted to the cans by pivots 38 which incorporate torsion springs 39 which bias the lids to the open position. Each of the lids 37 is held closed by a latch member 35 carried by one of the U-shaped members 23. The lids are thus controlled by the fins 22 in such a way that as the fins move to their extended positions the latches are released to open the parachute cans.

The booster assembly carries three rocket motors 40 which pass through the circular apertures afforded by cylindrical walls in the piston member 14 and are secured to the lower wall 16 thereof by bolts 41. At their upper ends the rocket motors are secured to the ring member 19 by straps 42. At their lower ends the rocket motors have discharge nozzles 43 which are very slightly angled away from the longitudinal axis of the booster assembly.

The rocket is launched as follows. The closure member 4 is removed and the booster assembly 6 and the rocket 5 with the guide member 10 in position are inserted into the tube with the three nozzles 43 aligned with the three circular portions of the aperture 8. The tie 28 is removed and the closure member 4 is replaced. The launcher is elevated to an approximately vertical position and when required the booster rockets are ignited by electrical igniting means 46 connected to external controls by umbilical cables (omitted from the drawing) which pass through the disc 15 and out through an opening in the wall of the tube 1. Initially discharged gases from the booster rocket motors pass almost directly through the aperture 8 in the rear wall of the closure member and there is only a small increase in pressure behind the piston member 14. As velocity of the rocket increases and the rocket travels along the tube, a larger proportion of the flow of gases from the booster rocket motors is intercepted by the rear wall of the closure member 4 and a smaller proportion passes through the aperture. Consequently, more of the discharge gases are trapped in the space between the piston disc 15 and the rear end of the tube so that the pressure in this area is maintained as the rocket accelerates up the tube. The sustainer motor in the rocket 5 may be ignited so as to begin to assist the booster as the rocket nears the upper end of the tube. As the rocket leaves the upper end of the tube the guide member 10 will disintegrate. Shortly after the rocket and booster assembly leave the tube the booster rocket motors 40 will be exhausted and the rocket 5 will leave the brackets 13 on the booster member and the rocket will then be free to rise away. Immediately the booster assembly leaves the launcher tube the springs 27 move the fins 22 to their extended positions and this releases the latches on the parachute cans, thus allowing them to open and the parachutes to be released. The booster assembly suspended from the parachutes will return to earth quite close to the point of launch. Meanwhile the rocket may continue to rise to a height of sixty or more miles.

In the particular example being described, the internal cross-sectional area of the launcher tube 1 is approximately 345 square inches, the cross-sectional area of the aperture 8 at the rear end of the launcher tube is approximately 93 square inches and the cross-sectional area of the rear end of each of the discharge nozzles 43 is approximately 4 square inches making a total discharge area of approximately 12 square inches.

Figure 6:
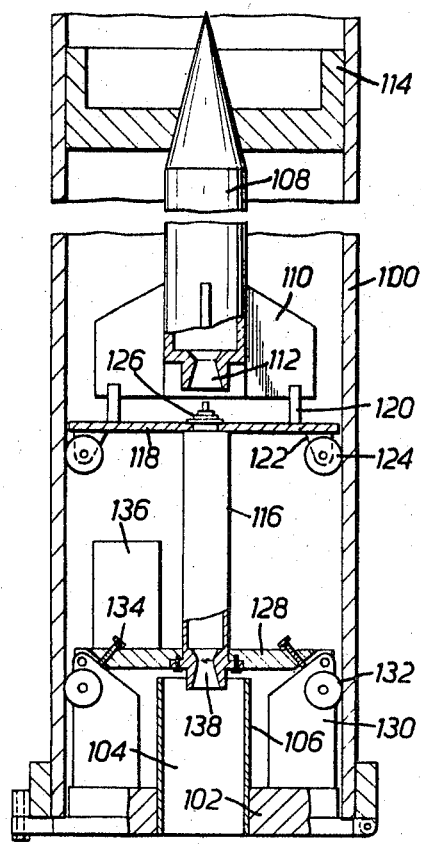
FIGURE 6 is a fragmentary longitudinal section similar to FIGURE 2 of another rocket and launcher in accordance with the invention.

In the rocket and launcher assembly shown in FIGURE 6 the launcher comprises a tube 100 and a hinged transverse rear wall 102. The transverse wall 102 has a hole 104 extending through it and fixed in this hole is a short tube 106. The tube 100 contains a main rocket 108 having fins 110, an exit nozzle 112 and a guide member 114. In addition there is a boost rocket 116 having a piston 118 fixed to its front end. This piston extends substantially right across the launcher tube 100 and has locating brackets 120 on its upper surface to receive the fins 110 of the rocket 108 and has brackets 122 carrying wheels 124 on its under-surface. These wheels engage the internal surface of the tube 100 to guide the rockets in their passage up the tube. The piston 118 also carries an igniter 126 which may be of any known construction and serves to ignite both the main rocket 108 and the booster rocket 116. The rear end of the booster rocket carries an openwork spider 128 to which are pivoted spring-loaded fins 130 carrying wheels 132. The amount by which the fins can pivot inwards is limited by adjustable stops 134 and in the inner position the wheels 132 engage the inner surface of the tube 100 to assist the wheels 124 to guide the booster rocket. The spider 128 also carries a cannister 136 in which a parachute is stored. It will be seen that the fins 130 support the booster rocket from the transverse wall 102 with the nozzle 138 of the booster rocket projecting a short way into the tube 106.

In operation the igniter 126 will ignite the two rockets which will produce propulsive gases at such a rate that the booster rocket is held in engagement with the main rocket at least until the main rocket has almost reached the exit end of the tube 100. The main rocket may not produce much gas until it is a considerable way up the tube. In the early stages the propulsive gases from the nozzle 138 of the booster rocket will pass straight through the tube 106 and the hole 104 in the transverse wall 102 to uncontained atmosphere but after a short time the diameter of the jet from the nozzle 138 at the level of the tube 106 will be greater than the diameter of the tube 106 so that pressure will be built up behind the piston 118. As in the first example, acceleration will be substantially constant over most of the passage of the rockets up the rocket tube without any marked peak so that the maximum velocity of the main rocket when it leaves the launch tube can be obtained from a given maximum acceleration.

Obviously many modifications and variations of the invention are possible without departing from the novel spirit and scope of the invention.

What I claim as my invention and desire to secure by Letters Patent is:

1. A rocket and launcher assembly comprising a main rocket having a main rocket motor, a booster assembly having at least one booster rocket motor, and a launcher including a tube containing said rocket and said booster assembly and having an open delivery end and a rear end and support means for supporting said tube generally vertically and with said rear end clear of the ground, said booster assembly being located in said tube to the rear of said rocket and contacting said rocket to transfer thrust thereto, said booster assembly including a piston member rigidly secured to the booster rocket motor and extending across substantially the entire internal cross-section of said tube, a rear wall projecting inwards from the wall of the tube at the rear end of the tube to form an aperture which extends directly through the rear wall to open directly rearwardly into unconfined air, the cross-section area of the aperture being between one-tenth and one-third of the cross-sectional area of said tube.

2. A rocket and launcher assembly comprising a main rocket having a main rocket motor, a booster assembly having a plurality of booster rocket motors, and a launcher including a tube containing said rocket and said booster assembly and having an open delivery end and a rear end and support means for supporting said tube generally vertically and with said rear end clear of the ground, said booster assembly being located in said tube to the rear of said rocket and contacting said rocket to transfer thrust thereto, said booster assembly comprising a plurality of booster rocket motors with their longitudinal axes parallel with and distributed symmetrically around the longitudinal axis of said tube and a piston member extending across substantially the entire internal cross-section of said tube and secured to said booster rocket motors adjacent the rear ends of said rockets and a support structure interconnecting said booster rocket motors adjacent their forward ends and guide means on said support structure and engaging the inner surface of said tube, said tube having a rear wall projecting inwards from the wall of the tube adjacent the rear end of the tube to form an aperture which extends directly through the rear walls to open directly rearwardly into unconfined air.

3. An assembly according to claim 2 wherein the cross-sectional area of said aperture is between one-tenth and one-third of the cross-sectional area of said tube.

4. An assembly according to claim 3 wherein said booster rocket motors have discharge nozzles and the cross-sectional area of said aperture is between five and twenty times the total cross-sectional area of the rear ends of said discharge nozzles.

5. An assembly according to claim 2 wherein said guide means are wheels.

6. An assembly according to claim 2 wherein said piston member carries wheels which engage the inner surface of said tube.

7. An assembly according to claim 2 which includes a plurality of fins pivoted to said piston member, said fins being pivotally movable between retracted positions in which they lie immediately to the rear of said piston member and with the radially outermost parts of the fins at a radius from the longitudinal axis of the tube not greater than that of the tube and extended positions in which they project radially beyond said piston member, and spring means biassing said fins to said extended positions.

8. An assembly according to claim 7 which includes at least one parachute container mounted on said booster assembly, said container having a closure biased to open position and a latch to hold said closure in closed position and operatively connected to one of said fins to be released on movement of said one fin to extended position.

References Cited

UNITED STATES PATENTS

| | | | |
|---|---|---|---|
| 2,960,034 | 11/1960 | Besserer | 102—49.4 |
| 3,369,455 | 2/1968 | Jones | 89—1.818 |
| 3,379,097 | 4/1968 | Fisher | 89—1.816 |

FOREIGN PATENTS

| | | |
|---|---|---|
| 1,125,143 | 7/1956 | France. |

SAMUEL W. ENGLE, Primary Examiner

U.S. Cl. X.R.

102—49; 244—3